United States Patent Office.

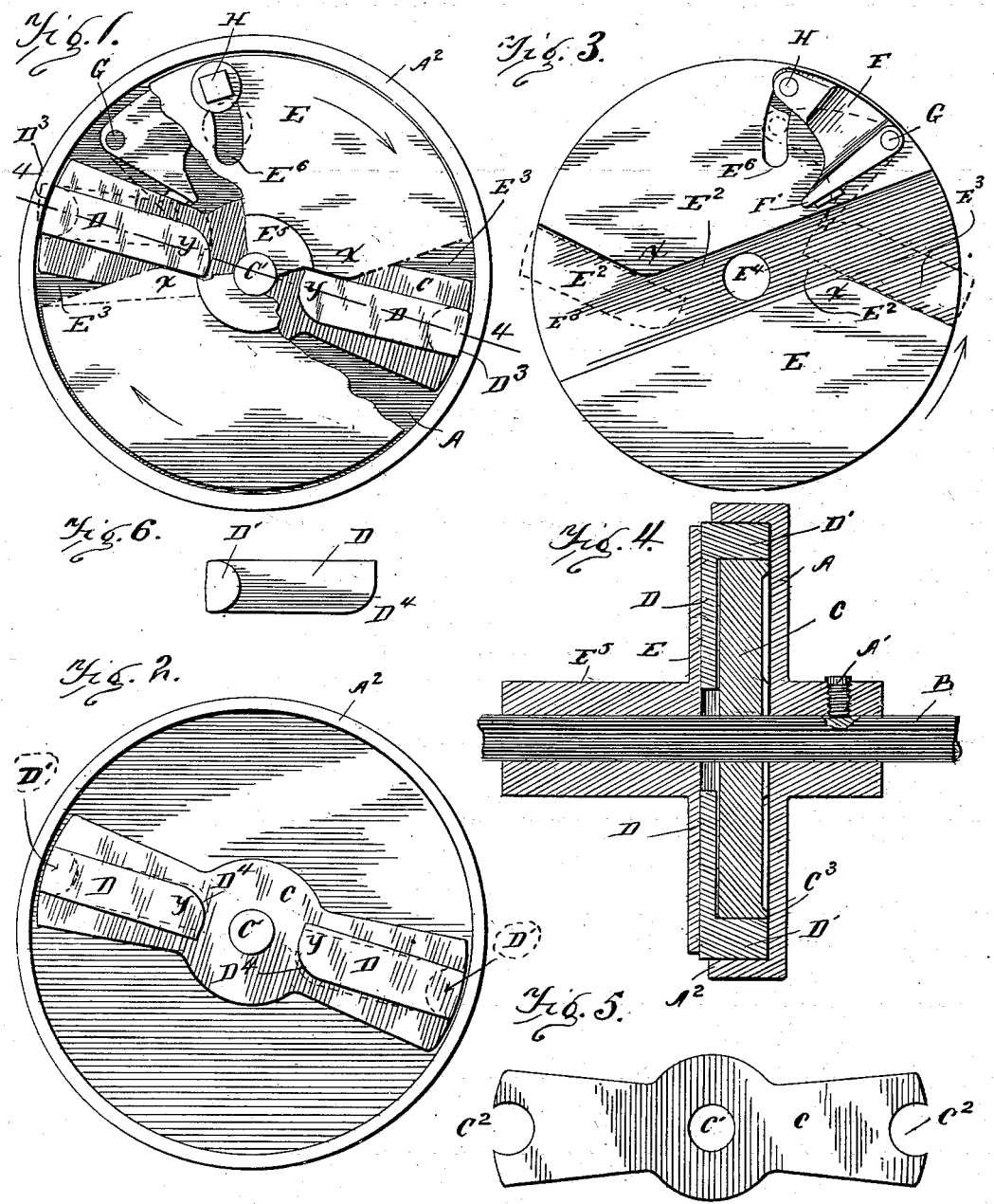

MARTIN BACKSTROM, OF CHICAGO HEIGHTS, ILLINOIS, ASSIGNOR TO THE CANEDY OTTO MANUFACTURING COMPANY, OF SAME PLACE.

FRICTION DRIVING-CLUTCH.

SPECIFICATION forming part of Letters Patent No. 651,816, dated June 19, 1900.

Application filed September 18, 1899. Serial No. 730,895. (No model.)

*To all whom it may concern:*

Be it known that I, MARTIN BACKSTROM, a citizen of the United States, residing at Chicago Heights, in the county of Cook and State of Illinois, have invented certain new and useful Improvements in Friction Driving-Clutches, of which the following is a specification, reference being had therein to the accompanying drawings.

This invention relates to friction-driving-clutch mechanism for shafts.

The object of the invention is to produce a driving-clutch in which the engaging parts may be brought into engagement by a slight movement in rotary direction of one of the coupling members and disengaged by a reverse movement or a retard action of one member relatively to the other, so that a very slight change in relative speed may couple or uncouple the driving and driven members; also, to produce an adjusting device by which the bearing of the contact parts may be regulated and wear compensated for; also, to improve the construction of clutches of this general character in various particulars, substantially as hereinafter described.

While this clutch may be called a "friction-clutch," the locking engagement is so firm that it may be said to be almost a "positive" clutch.

Figure 1 is an end view of the clutch, part of the disk of one member being broken away. Fig. 2 is an inner view of the cup member of the clutch with cross-bars and grip-levers in position. Fig. 3 is an inner face view of disk shown broken in Fig. 1 and the adjusting-stop. Fig. 4 is a cross-section of the clutch on line 4 4, Fig. 1. Fig. 5 is a plan of the cross-bar or lever-carrier. Fig. 6 is a plan of one of the levers.

A indicates the cup or rim member, which member is fastened to the shaft B in any suitable manner, as by key A'. The rim $A^2$ of this cup is concentric with the shaft and is a true circle on its inner surface. The cup A may be the hub of a driving-wheel or may be connected to a wheel or pulley in any convenient way.

C denotes a cross-bar which extends nearly across the interior of cup A, so that its outer ends come nearly to the inner rim of the cup, but never touch it. This bar has an opening C', which embraces the shaft, but leaves the bar free to rotate on said shaft. At the outer ends of bar C are segmental recesses $C^2$. The back side of bar C is preferably concave or cut away, so as to leave but little bearing-surface against the cup A, as indicated at $C^3$.

D D denote levers which have integral pivots D' at their outer ends. These pivots are in section segments of cylinders which fit recesses $C^2$, and the outer ends of the levers and their pivots are curved on arcs approximating to the inside curve of the rim $A^2$. (See Fig. 6.) The corner $D^4$ of lever D is preferably rounded.

The disk member E is approximately as large in diameter as the interior of cup A. This disk has a transverse groove $E^2$ in the face which is toward the cup. The outer ends of this groove or recess are widened, as indicated at $E^3$, and the disk is bored centrally to pass over the shaft, being free to turn thereon. The hub $E^5$ of disk E affords means of connecting to a driving mechanism of any suitable kind, and if driven in the direction of the arrows, Figs. 1 and 3, the disk E will cause the clutch engagement, while a reversal or retardation of movement will release the clutch engagement, as will be explained.

When the clutch is assembled in unlocked position, the levers D D lie in the groove $E^2$ in substantially-radial relation to the cup $A^2$ and there is no contact between the members; but a change of the relative speed which shall cause the shoulders $x$ at the edge of groove $E^2$ to bear against the sides of the levers D will rock such levers on the pivotal projections D', so that the outer ends of said levers instead of being concentric with the rim $A^2$ become eccentric thereto and the corners $D^3$ of the levers bite against the inner face of the rim.

The cross-bar C, which supports and forms the fulcrum of levers D, can be shifted, so that the levers may be permitted more or less swing. Thus ordinarily if bar C has its central line parallel with the straight groove or recess $E^2$ the width of the straight part of this groove will be the limit of movement of the free end of levers D; but the enlarged spaces $E^3$ will permit a greater latitude of movement of these levers, and a change of position of the cross-bar will permit such movement, although the groove $E^2$ retains the same relative position as before.

A crank-lever F, pivoted at G to disk E, has a bearing-toe F', which lies in front of cross-bar C. This crank-lever may be adjusted to several positions by means of a set-screw H, passing through a slot $E^6$ in the disk E and engaging one arm of the crank-lever. The crank-lever F may thus be adjusted to hold back the leading face or edge of cross-bar C, and this holding back of the bar permits a greater range of movement of the levers D in the widened recess $E^2$—that is, the levers, having their pivots in a different position in the groove, may swing to a greater angle before the biting-toes engage the cup or may engage with greater pressure. (See dotted lines, Fig. 3.) The corners of levers D are preferably rounded at $D^4$ to give a greater range of movement. (See dotted lines, Figs. 1 and 3.) Thus as engaging corners of levers D wear away their initial position may be changed to compensate for such wear, (see dotted lines left side, Fig. 1,) as the position of bar C relatively to groove $E^2$ determines the limit of movement of levers D, and so of the locking or binding pressure which may be brought to bear on the rim.

The mechanical applications for this clutch are very numerous. It can be used as a substitute for the common ratchet-wheel and pawl-driving mechanism which drives in one direction and not in the other, or for the numerous substitutes for such driving-gear. By a reversal of position either of the members may be the driver and the other member may be the driven member. The operation of the parts is smooth and practically noiseless and the engagement or disengagement may be almost instantaneous. The feature of compensation for wear is very important, and as almost all the wear is on levers D these levers can be replaced when worn out at small expense.

It is supposed, as shown in the drawings, which are correct representations of an operative machine, that the hub $E^5$ is free to rotate on shaft B, while the hub of pulley A is fixed to said shaft. Now if hub $E^5$ be rotated by any usual power, as by a belt passing around said pulley, causing it to serve as a driving-pulley, or by turning it by manual power or otherwise, a very slight forward movement causes the biting-toes of the levers to engage the cup and turn such cup and with it the shaft B. The ends of levers D are normally so close to the cup that a backward rotation of the cup, either by a slight frictional engagement or for some other reason, causes a similar engagement and binding action, as has been repeatedly demonstrated by actual test.

What I claim is—

1. In a clutch of the character described, the cup member having a circumferential rim, the cross-bar loosely supported on the shaft within the cup, the levers pivoted in recesses at the outer ends of said bar, and the disk having a transverse groove in which the inner ends of said levers lie, so that the walls of said groove may bear against the edges of the levers, in certain positions, all combined and relatively arranged with relation to a shaft, substantially as described.

2. In a clutch as described, the driven cup, the driving-disk grooved transversely, the cross-bar, the binding-levers pivoted to said cross-bar, and an adjustable stop by which the forward position of the cross-bar may be adjusted, all combined substantially as described.

3. In a clutch as described, the cup or rim, the cross-bar lying within the same and having curved recesses at its outer ends, the levers having pivot-pins lying in said recesses, the outer ends of said levers being arcs of the circle of the inner face of the cup-rim, and means extending to the driving-shaft for rocking the levers on their pivot-pins to engage said rim, all combined substantially as described.

4. In a clutch of the character described, a cup or rim, a cross-bar within the same, a lever pivoted at the outer end of said bar to engage the rim, a driving-disk having contact-shoulder to rock said lever into engagement with the rim, and means for adjusting the initial position of the cross-bar and lever, all combined substantially as described.

5. In a clutch as described, the rim, cross-bar, and lever on said bar, a disk having a shoulder to rock said lever into engagement with the rim, and a crank-lever on the disk acting as a stop to the cross-bar, and means for holding said crank-lever in adjusted position, the specified elements combined substantially as described.

6. The friction driving-clutch described, consisting essentially of a cup member with rim concentric with the shaft, a disk member on said shaft with its edge near said rim, one of said members being secured to the shaft and the other free, said disk having a transverse groove with end enlargements, a cross-bar within the cup having segmental recesses at its outer ends, levers with segmental pivots in said recesses, the bodies of the levers being in the groove of the disk, and an adjustable stop whereby the advance position of the cross-bar may be determined, all combined substantially as described.

In testimony whereof I affix my signature in presence of two witnesses.

MARTIN BACKSTROM.

Witnesses:
DAVID WALLACE,
FRED KIRGIS.